(12) United States Patent
Horimatsu et al.

(10) Patent No.: US 6,286,807 B1
(45) Date of Patent: Sep. 11, 2001

(54) MOLD FOR EXPANDING MOLDINGS

(75) Inventors: Toshiyuki Horimatsu; Tatsuo Yata; Yoichi Nabeshima, all of Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/348,010

(22) Filed: Jul. 6, 1999

(30) Foreign Application Priority Data

Jul. 24, 1998 (JP) .................................................. 10-209756

(51) Int. Cl.[7] .................................................. B29C 39/26
(52) U.S. Cl. ........................ 249/121; 249/129; 249/130
(58) Field of Search .................................... 249/129, 130, 249/121

(56) References Cited

U.S. PATENT DOCUMENTS 1,889,481 * 11/1932 Kennedy, Jr. ............................ 249/71
2,804,755 * 9/1957 Ansel ...................................... 249/121
4,372,526 * 2/1983 Daenen et al. ........................ 249/119

FOREIGN PATENT DOCUMENTS 29 14 042    10/1980 (DE) .
4-371812    12/1992 (JP) .

* cited by examiner

Primary Examiner—Nam Nguyen
Assistant Examiner—Joseph S. Del Sole
(74) Attorney, Agent, or Firm—Kanesaka & Takeuchi

(57) ABSTRACT

A mold for expanded moldings capable of efficiently forming small-sized products in high-yield includes a vessel-shaped lower mold and an upper mold covering the lower mold. A partition wall is disposed protrusively from the bottom surface of the upper mold, and the partition wall divides the inside of the mold into a plurality of small cavities. A clearance of approximately 1 to 10 mm is defined between the partition wall and the base of the lower mold.

4 Claims, 3 Drawing Sheets

MOLD FOR EXPANDING MOLDINGS

FIELD OF THE INVENTION

The present invention relates to molds for foam casting expanded moldings such as polyurethane foams, and in particular relates to a mold suitable for foam casting small-sized expanded moldings.

DESCRIPTION OF THE RELATED ART

Polyurethane foams have various uses such as thermal insulators, shock absorbers, cushioning materials, moisture absorbers, and sound-absorbing materials, and are formed by spray forming in place, foam casting, lamination, etc., according to applications.

Among these methods, the foam casting is suitable for producing comparative small-sized products of miscellaneous shapes such as pads, automobile interior parts, and sundries, utilizing a mold having cavities of predetermined shapes. In this method, the component of polyisocyanates is blended in a mixing head with a liquid mixture of the component of polyol, a blowing agent, a catalyst, a foam regulating agent, and other auxiliary agents to obtain a raw liquid material for foaming (liquid for pouring) which is poured into cavities of a mold to be foam cast in the mold.

Generally, a mold for use in foam casting is vessel-shaped and has one cavity per mold. When small-sized moldings are formed, a plurality of molds are arranged on a pallet to perform foam casting by sequentially pouring the liquid for pouring from the mixing head into each cavity.

When small-sized moldings are formed by this method, there have been the following problems.

i) The weight of the molding is limited to the minimum delivery amount of the mixing head and a smaller-sized molding than the minimum delivery amount cannot be formed.

ii) As the size of the molding decreases, variations in the weight of the moldings increase due to errors in pouring amount of liquid for pouring in each mold, resulting in a reduced manufacturing yield.

iii) Although a large number of the molds for a smaller-sized molding can be arranged on a pallet to increase the number of moldings per pallet, as the time for pouring from the mixing head is limited, the number of molds arrangeable on a pallet is also limited, so that a large number of the molds cannot be produced at a time.

iv) Since the same number of molds as that of moldings is arranged on a pallet, dead air spaces (walls of molds and spaces between molds) are large.

Accordingly, in a conventional mold for expanded moldings, miniaturization of the product is limited and small-sized expanded products cannot be efficiently produced in high-yield.

OBJECT AND SUMMARY OF THE INVENTION

It is an object of the present invention to provide a mold for expanded moldings capable of efficiently producing smaller-sized products in high-yield by solving the above-mentioned problems.

A mold for expanded moldings according to the present invention comprises a vessel-shaped lower mold; an upper mold covering the lower mold; and a partition wall disposed protrusively from the bottom surface of the upper mold, wherein the inside of the mold is divided into a plurality of small cavities by the partition wall.

Since in the mold for expanded moldings according to the present invention, the inside space of the vessel-shaped lower mold is divided into a plurality of small cavities by the partition wall of the upper mold, a plurality of moldings can be formed by one casting in one mold, and the following effects will come into play.

A. The possible minimum weight of the product is to be (the minimum delivery amount of the mixing head)/(the number of divisions), thus a smaller size product than the minimum delivery amount can be produced.

B. The moldings formed in at least one mold are hardly subject to variations in weight, etc., and can be produced in high-yield.

C. When the number of molds corresponding to the maximum number of pouring by the mixing head are disposed, moldings as a multiple of both the number of divisions of each mold and the number of molds on a pallet can be produced on one pallet.

D. Since the number of molds disposed on a pallet relative to the number of moldings produced is extremely reduced, efficiency of space utilization is increased and the dead air spaces are reduced so that a large number of moldings can be produced on one pallet.

The following features of the present invention permit an equalized level of poured liquid in each small cavity by smooth feeding of the liquid to each small cavity of the lower mold without being divided by any portion other than the partition wall.

(i) In order to feed the poured liquid along the cavity base, the cavity base may be a smooth surface.

(ii) When a protrusion or a raised line is formed on the base of the cavity of the lower mold, the height of the protrusion or the raised line may be lower than a level of poured liquid so that the poured liquid can readily flow across the protrusion or the raised line. The raised line may be preferably disposed in a portion of the base of the cavity of the lower mold facing the bottom end of the partition wall.

(iii) The base of the cavity of the lower mold may be an inclined surface so that a portion of the base facing the bottom end of the partition wall is to be the deepest portion of the lower mold, preferably with a falling gradient of below 60° toward the deepest portion.

In the mold according to the present invention, although it is preferable that the casting be performed by spraying liquid for pouring toward the cavity base facing the bottom end of the partition wall so as to uniformly distribute the liquid to each cavity, there are some cases, in effect, that the spraying misses the target, or the poured liquid is splashed onto other places. However, the above-described features enable the poured liquid in the cavity to smoothly flow toward the bottom end of the partition wall to produce equalized products within target specifications.

Foaming pressure in each of the small cavities divided by the partition wall is equalized by a clearance of approximately 1 to 10 mm defined between the bottom end of the partition wall and the portion of the base of the cavity of the lower mold facing the bottom end of the partition wall, so that variations in weight and dimensions of the product due to foaming pressure deviation can be suppressed.

BRIEF DESCRIPTION OF THE DRAWINGS

FIG. 1b is a sectional view taken along line 1b—1b of FIG. 1a;

FIG. 2b is a sectional view taken along line 2b—2b of FIG. 2a;

DETAILED DESCRIPTION OF THE PREFERRED EMBODIMENTS

Figure 1A:
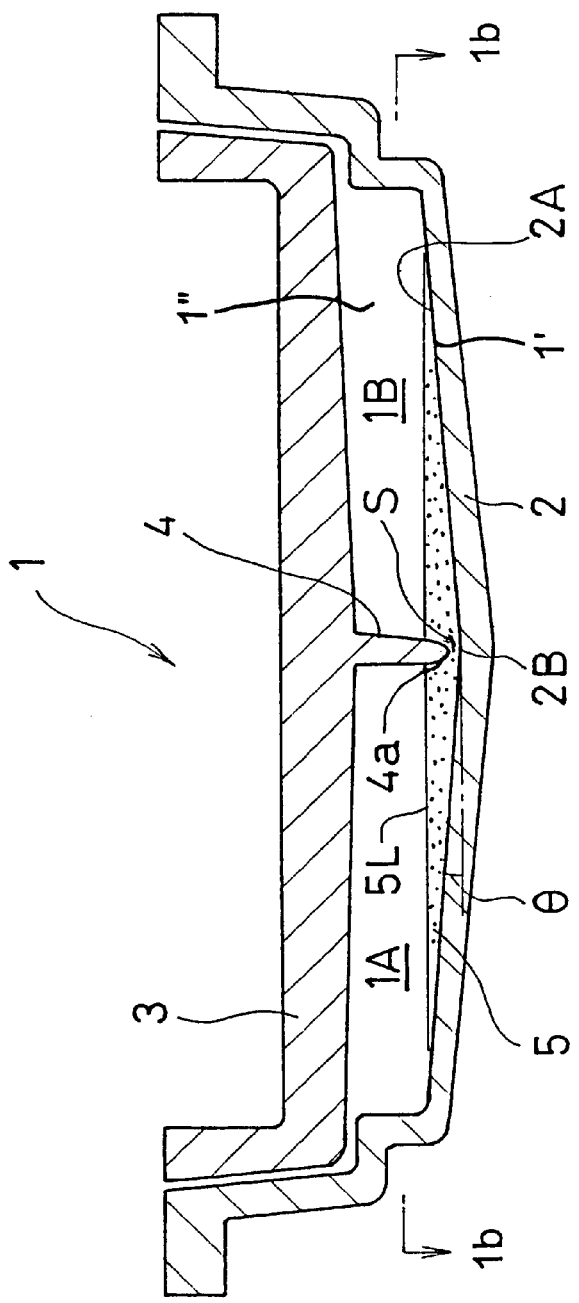
FIG. 1a is a sectional view of a mold for expanded moldings according to an embodiment of the present invention.

Referring to the drawings, embodiments of the present invention will be described in detail.

Figure 1B:
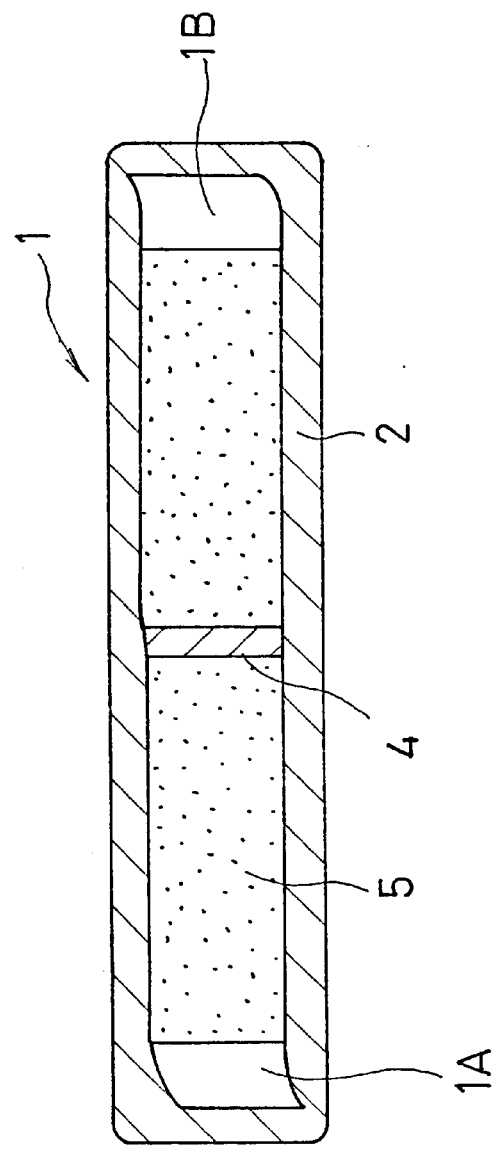

A mold 1 for expanded moldings shown in FIGS. 1a and 1b comprises a lower mold 2 of a comparatively shallow vessel shape and an upper mold 3 covering the lower mold 2, and two small cavities 1A and 1B are formed in the mold 1 by a partition wall 4 disposed protrusively from the bottom surface of the upper mold 3.

A cavity base 2A of the lower mold 2 has a smooth surface and also an inclined plane with a falling gradient toward a portion 2B of the cavity base 2A facing the bottom end 4a of the partition wall 4 so that the portion 2B is to be a deepest portion. The deepest portion 2B of the cavity base 2A will be referred to "the deepest portion", as the case may be.

Liquid 5 for pouring poured in the mold 1 flows smoothly along the cavity base owing to the smooth and inclined cavity base 2A of the lower mold 2. The liquid 5 for pouring is equally divided by the partition 4 so that the surfaces 5L of the liquids 5 for pouring in the small cavities 1A and 1B become the same level, resulting in extremely reduced variations in the product weight. Thus, each of the cavities 1A and 1B has a bottom section 1' for receiving the liquid 5 and an upper section 1" above the bottom section for allowing the liquid 5 to expand.

A gradient "θ" of the inclined plane toward the deepest portion 2B of the cavity base 2A of the lower mold 2 is preferably below 60° in general, below 45° in particular, and below 20° above all, depending on a shape of the product.

In the mold 1, since a clearance "S" is defined between the bottom end 4a of the partition wall 4 and the deepest portion 2B of the cavity base 2A of the lower mold 2 facing the bottom end 4a, small cavities 1A and 1B divided by the partition wall 4 can be uniformly maintained in foaming pressure, so that variations in the weights and sizes of the products formed in each of small cavities 1A and 1B can be suppressed.

When the clearance "S" is excessively small, uniformity in foaming pressure by the clearance cannot be achieved, in contrast when it is excessively large, divisibility (independence) between small cavities by the partition wall 4 is impaired. The clearance "S" is preferably approximately 1 to 10 mm, depending on product and mold dimensions.

Figure 2A:
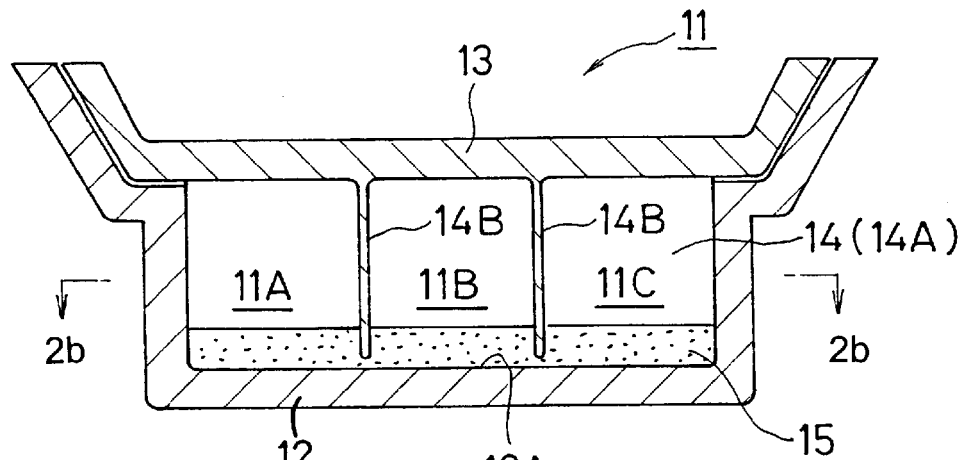
FIG. 2a is a sectional view showing another embodiment according to the present invention.
Figure 2B:
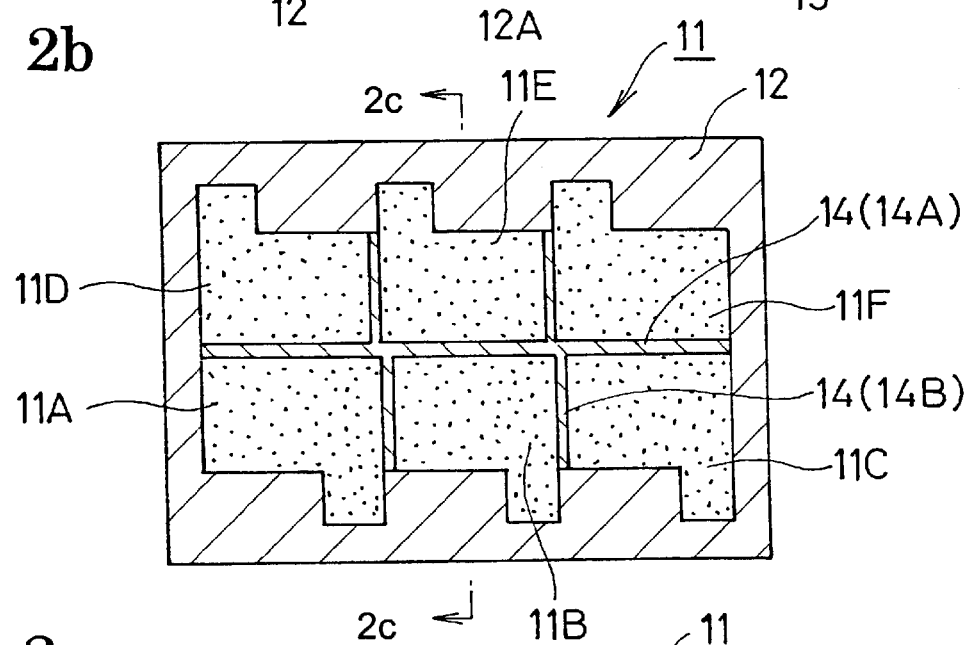
Figure 2C:
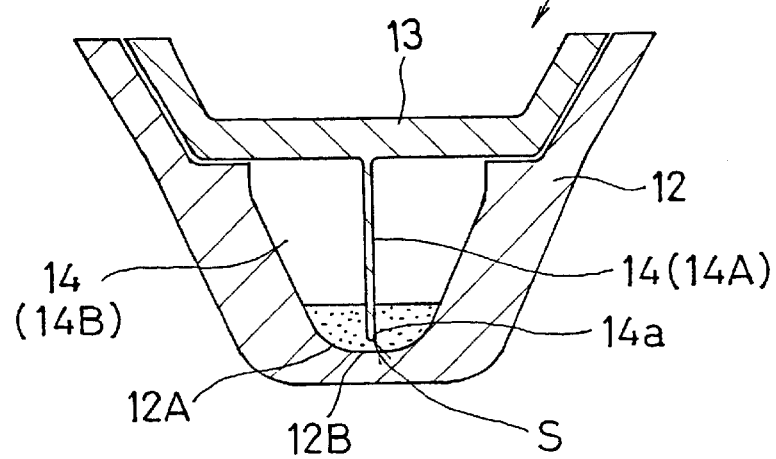
FIG. 2c is a sectional view taken along line 2c—2c of FIG. 2b.

The inside of a mold 11 for expanded moldings shown in FIGS. 2a to 2c is divided into six small cavities 11A, 11B, 11C, 11D, 11E, and 11F formed in the mold 11 by a partition wall 14 disposed protrusively from the bottom surface of the upper mold 13. The partition wall 14 comprises a main plate 14A which divides the mold 11 sidewise into two parts and side plates 14B which further divide each of the divided parts lengthwise into three parts, resulting in dividing the mold 11 into six parts by the side plates 14B.

In the mold 11 for expanded moldings, a cavity base 12A of the lower mold 12 is also a smooth surface. A portion in the cavity base 12A facing the bottom end 14a of the main plate 14A of the partition wall 14 is defined to be the deepest portion 12B, so that liquid 15 for pouring is equally divided among the small cavities 11A to 11F.

In the mold 11 for expanded moldings, a clearance "S" is also defined between the bottom end 14a of the partition wall 14 and the cavity base 12A of the lower mold 12, so that in each of small cavities 11A to 11F, uniform foaming pressure can be obtained.

Figure 3:
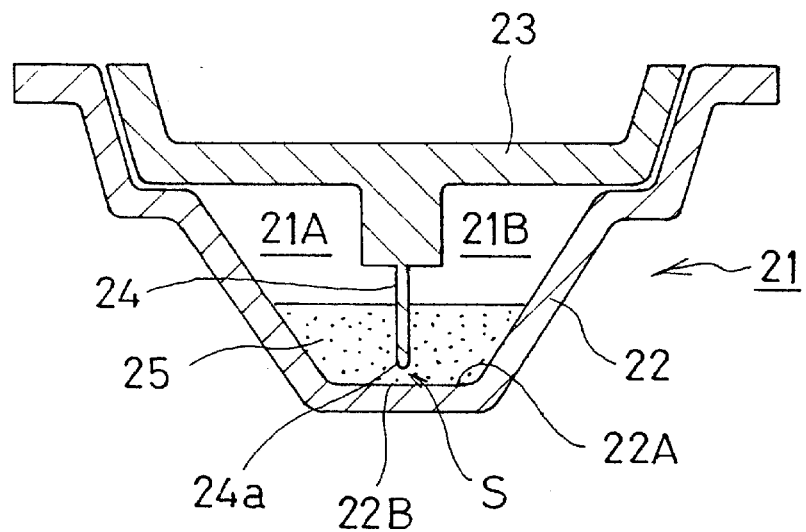
FIG. 3 is a sectional view of a mold for expanded moldings according to still another embodiment of the present invention.

A mold 21 for expanded moldings shown in FIG. 3 comprises a lower mold 22 of a comparatively deep vessel shape and an upper mold 23 covering the lower mold 22, and the inside of the mold 21 is divided into plural small cavities 21A, 21B formed in the mold 21 by a partition wall 24 disposed protrusively from the bottom surface of the upper mold 23.

In the mold 21 for expanded moldings, a cavity base 22A of the lower mold 22 is also a smooth surface. A portion in the cavity base 22A facing the bottom end 24a of the partition wall 24 is defined to be the deepest portion 22B, so that liquid 25 for pouring is equally divided among the small cavities 21A, 21B.

In the mold 21 for expanded moldings, a clearance "S" is also defined between the bottom end 24a of the partition wall 24 and the cavity base 22A of the lower mold 22, so that in each of small cavities 21A, 21B, uniform foaming pressure can be obtained.

Figure 4:
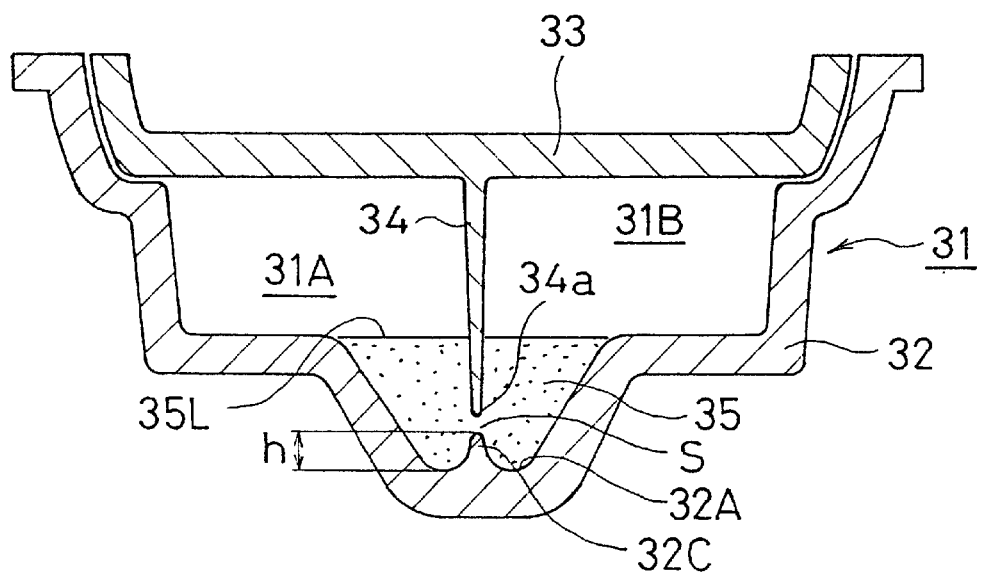
FIG. 4 is a sectional view of a mold for expanded moldings according to a further embodiment of the present invention.

In a mold 31 for expanded moldings shown in FIG. 4, a raised line 32C is formed in a portion of a cavity base 32A of a lower mold 32 facing the bottom end 34a of a partition wall 34 disposed protrusively from the bottom surface of an upper mold 33. The inside of the mold 31 is divided into plural small cavities 31A, 31B by the raised line 32C and the partition wall 34.

When the raised line 32C or a protrusion is formed on the cavity base 32A of the lower mold 32, an excessive height of the raised line 32C or a protrusion obstructs the flow of liquid 35 for pouring, so that the liquid 35 for pouring is not equally divided among each of small cavities 31A, 31B. A height "h" of the raised line 32C or a protrusion is preferably lower than a liquid level 35L of the liquid 35 for pouring. The height "h" is preferably below 10 mm, below 5 mm in particular, depending on a size of the product and a depth of the mold.

In the mold 31 for expanded moldings, a clearance "S" is also defined between the bottom end 34a of the partition wall 34 and the top end of the raised line 32C, so that in each of small cavities 31A, 31B, uniform foaming pressure can be obtained.

In accordance with the present invention, the number of small cavities in the mold is not particularly limited, and a large number of small cavities can be formed in the mold by an appropriate design of a shape of the partition wall.

The mold for expanded moldings according to the present invention is useful for comparative small-sized moldings of expanded resins such as polyurethane foams, expanded rubbers, and expanded inorganic hardened bodies. However, without being limited to the small-sized moldings, it is applicable to medium-sized or large-sized moldings, so that increased number of moldings formed in one casting can remarkably enhance productive efficiency.

As described above in detail, by utilizing the mold for expanded moldings according to the present invention, a large number of expanded moldings can be formed by one mold, and variations in the weights, densities, etc., of the expanded moldings produced in high-yield are extremely reduced.

What is claimed is:

1. A mold for expanded moldings, comprising:

a vessel-shaped lower mold forming a cavity and having a base, a bottom section for receiving a liquid for expansion, a protrusion formed on the base and located in the bottom section to be disposed in the liquid, and an upper section located above the bottom section for allowing the liquid retained in the lower section to expand in an expanded molding;

an upper mold for covering said lower mold above the upper section and having a bottom surface; and a partition wall disposed protrusively from the bottom surface of said upper mold so that an inside of said mold is divided into a plurality of small cavities by said partition wall, said partition wall extending through the upper section into the bottom section to form a clearance between a bottom end of the partition wall and the base of the lower mold so that the clearance serves a function of equally maintaining a level of the liquid poured in each of the small cavities and of unifying foaming pressure in each of the small cavities.

2. A mold according to claim 1, wherein the base of said lower mold has a smooth surface.

3. A mold according to claim 1, wherein the protrusion is disposed in a portion of the base of the cavity of said lower mold facing the bottom end of said partition wall.

4. A mold according to claim 1, wherein the clearance defined between the bottom end of said partition wall and the portion of the base of the cavity of said lower mold facing the bottom end of said partition wall is 1–10 mm.

* * * * *